3,282,148
INTERFEROMETER COMPRISING TWO OPTICAL FLATS WITH SUPERPOSED LAMINAR DIFFRACTION GRATINGS
Yahiko Yamada, Kitatama-gun, Tokyo-to, Japan, assignor to Kabushiki Kaisha Hitachi Seisakusho, Tokyo-to, Japan, a joint-stock company of Japan
Filed Jan. 15, 1963, Ser. No. 251,609
1 Claim. (Cl. 88—14)

This invention relates to interferometers, and more particularly it relates to a new interferometer consisting of a multi-reflection or a multi-transmission interferometer, such as a Fabry-Perot type interferometer or a Lummer-Gehrcke type interferometer, in which a laminar diffraction grating is incorporated.

The nature, principle, and objects of the invention will be best understood by reference to the following description, beginning with a consideration of a conventional practice and disadvantage thereof.

Figure 1:
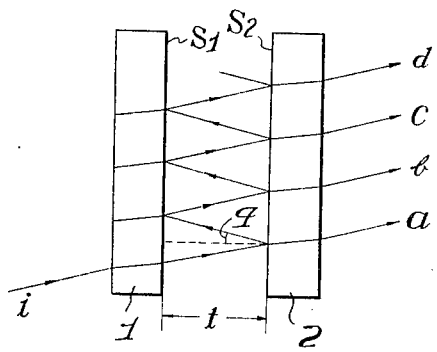
FIGURE 1 is a schematic diagram of a conventional interferometer.

Heretofore, the Fabry-Perot type interferometer, which has had the highest resolving power and is used in research on the hyperfine structure of spectral lines, has had a construction which, in the most common form, is indicated in FIGURE 1. That is, two optical flats 1 and 2 having, on their respective one side, reflecting surfaces $S_1$ and $S_2$, respectively, rendered reflective by such coating as silvering, are placed in mutually parallel disposition with the said reflecting surfaces $S_1$ and $S_2$ in mutually facing orientation with a certain distance therebetween.

In the operation of the interferometer of the above-described arrangement, light from a light source is collimated by a collimator lens and projected into the above interferometer. The incident light, for example, as represented by incident light $i$, passes through the optical flat 1, and at the reflecting surface $S_2$ one portion of this incident light is reflected, and one portion is transmitted through the optical flat 2. The light which has been reflected at the reflecting surface $S_2$ is further reflected at the optical flat 1 and then is projected again to the optical flat 2, where one portion of this light is reflected and one portion is transmitted through similarly as described above. In this manner, this operation is repeated successively, and, as indicated in the drawing, transmitted light portions $a$, $b$, $c$, $d$ . . . which have passed through the optical flats 1 and 2 are obtained on the side opposite that of the light source.

In this case, these transmitted light portions $a$, $b$, $c$, $d$ . . . create clear and sharp interference fringes infinitely in a direction satisfying the following relation:

$$n\lambda = 2\mu t \cos \varphi$$

where:
$n$ is an integer;
$\mu$ is the refractive index of the substance existing between the optical flats 1 and 2;
$t$ is the distance between the optical flats 1 and 2; and
$\lambda$ is the wavelength of the incident light.

Accordingly, by placing a condensing lens behind the optical flat 2, it is possible to obtain concentric, circular interference fringes. In this case, however, since it is necessary that the incident light $i$ have a wavelength in a certain region in the vicinity of that of monochromatic light, it has heretofore been necessary to monochromatize the incident light beforehand by such a means as a premonochromator.

It is an object of the present invention to eliminate the above-stated disadvantage in the manner described in detail hereinbelow.

It is a specific object of the invention to provide a new interferometer of simple constructional arrangement whereby the above-stated object can be achieved.

Figure 2:
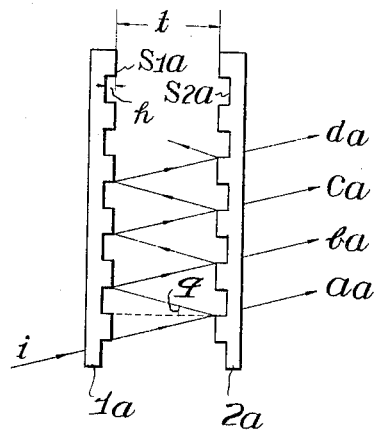
FIGURE 2 is a schematic diagram of an embodiment of the interferometer according to the present invention.

In the embodiment of the interferometer according to the present invention shown in FIGURE 2, each of two optical flats $1a$ and $2a$ are laminar diffraction gratings manufactured by forming a plurality of rectangular-section grooves at constant intervals on one of its two flat surfaces of each of the optical flats and by making said surfaces reflective by coating silver thereon. The said two optical flats are so disposed in mutually parallel positions that the said reflective surfaces are mutually facing at a distance $t$ from each other.

In the operation of the interferometer of the invention of the above-described construction, light which has passed through the diffraction grating $1a$ is projected to the laminar surface $S_{2a}$, where one portion of this light is transmitted, and one portion is reflected. This process is successively repeated at the laminar surfaces $S_{1a}$ and $S_{2a}$ of the diffraction gratings $1_a$ and $2_a$. The transmitted light portions $a_a$, $b_a$, $c_a$, $d_a$ . . . so obtained exhibit interference fringes in the direction satisfying the condition expressed by $$n\lambda = 2\mu t \cos \varphi$$

similarly as in the case of a conventional Fabry-Perot interferometer.

In the case of the interferometer of the present invention, however, it is possible, by suitably selecting such factors as the laminar step $h$ and the refractive index of the blank of the laminar diffraction gratings, to cause the light reflected by the grooves and the light reflected by the other parts to interfere mutually during the repetition of reflection at the laminar surfaces $S_{1a}$ and $S_{2a}$, thereby causing the passage of only a certain wavelength region in the vicinity of that of monochromatic light.

From the foregoing description it will be observed that the present invention provides a novel interferometer wherein, by the use of a simple constructional arrangement, the function of a premonochromator is incorporated therein. Accordingly, it will be appreciated that the present invention is highly effective in practice.

Although this invention has been described with respect to a particular embodiment thereof, it is not to be so limited as changes and modifications can be made therein which are within the full intended scope of the invention, as defined by the appended claim.

What is claimed is:

An interferometer comprising two optical flats, each of which has a plurality of rectangular-section grooves formed at predetermined intervals on one of its two flat surfaces, which is rendered reflective by a reflecting coating film, whereby two laminar diffraction gratings are thus formed, the said two optical flats being disposed with their reflective surfaces in parallel relationship to each other and facing each other at a predetermined distance; the light reflected by said grooves being caused to interfere with repeated reflection at said surfaces so that only a wavelength region in the vicinity of monochromatic light can pass.

References Cited by the Examiner
UNITED STATES PATENTS
3,090,279  5/1963  Chisholm _____ 88—14

OTHER REFERENCES

Ramsay, "A Grating Interferometer," Journal of the Optical Society of America, vol. 24, September 1934, pp. 253–258.

JEWELL H. PEDERSEN, *Primary Examiner.*
JOHN K. CORBIN, *Examiner.*